US012585509B1

(12) United States Patent
Kallakuri et al.

(10) Patent No.: US 12,585,509 B1
(45) Date of Patent: Mar. 24, 2026

(54) AUTOMATIC REBALANCING OF CONTAINER-BASED SERVICES FOR HIGH AVAILABILITY

(71) Applicant: Amazon Technologies, Inc., Seattle, WA (US)

(72) Inventors: Kumar Deepak Syam Kallakuri, Fremont, CA (US); Malcolm Featonby, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 640 days.

(21) Appl. No.: 17/709,649

(22) Filed: Mar. 31, 2022

(51) Int. Cl.
*G06F 9/50* (2006.01)
*G06F 11/14* (2006.01)

(52) U.S. Cl.
CPC .......... *G06F 9/5083* (2013.01); *G06F 9/5072* (2013.01); *G06F 9/5077* (2013.01); *G06F 11/1425* (2013.01)

(58) Field of Classification Search
CPC .... G06F 9/5083; G06F 9/5072; G06F 9/5077; G06F 11/1425
See application file for complete search history.

(56) References Cited

U.S. PATENT DOCUMENTS

| | | | |
|---|---|---|---|
| 9,256,467 B1 * | 2/2016 | Singh | G06F 9/5005 |
| 10,178,810 B1 * | 1/2019 | Magcale | H05K 7/20272 |
| 10,250,603 B1 * | 4/2019 | Roth | H04L 63/10 |
| 2019/0102226 A1 * | 4/2019 | Caldato | G06F 9/5072 |

* cited by examiner

*Primary Examiner* — Wissam Rashid
(74) *Attorney, Agent, or Firm* — Nicholson De Vos Webster & Elliott LLP

(57) ABSTRACT

Techniques are described for enabling a container service of a cloud provider network to detect imbalances of container placements across a selected set of availability zones (AZs) and to automatically rebalance placement of the containers, if needed. An actual distribution of containers may differ from an expected distribution according to a configured placement strategy, e.g., due to an outage or other operational issue affecting one or more of the AZs, scaling operations over time, and the like. In these and other scenarios, the container service can rebalance placement of the containers by terminating one or more containers in one or more of the AZs and launching additional containers in one or more other AZs to restore a more desirable balance. The periodic rebalancing of containers in this manner improves a container-based application's ability to load balance demand and further improves application availability by ensuring sufficient capacity is spread across multiple AZs.

20 Claims, 8 Drawing Sheets

OPERATIONS
500

LAUNCHING, BY A CONTAINER SERVICE OF A CLOUD PROVIDER NETWORK, A PLURALITY OF CONTAINERS, WHEREIN EACH CONTAINER OF THE PLURALITY OF CONTAINERS IS EXECUTED ON COMPUTING INFRASTRUCTURE WITHIN ONE OF A PLURALITY OF AVAILABILITY ZONES (AZS) OF THE CLOUD PROVIDER NETWORK, AND WHEREIN THE CONTAINER SERVICE PLACES EACH CONTAINER IN A PARTICULAR AZ OF THE PLURALITY OF AZS ACCORDING TO A CONFIGURED PLACEMENT STRATEGY 502

IDENTIFYING AN ACTUAL DISTRIBUTION OF THE PLURALITY OF CONTAINERS ACROSS THE PLURALITY OF AZS 504

DETERMINING THAT THE ACTUAL DISTRIBUTION OF THE PLURALITY OF CONTAINERS DIFFERS FROM AN EXPECTED DISTRIBUTION OF THE PLURALITY OF CONTAINERS BASED ON THE PLACEMENT STRATEGY 506

REBALANCING PLACEMENT OF THE PLURALITY OF CONTAINERS BY: TERMINATING AT LEAST ONE CONTAINER OF THE PLURALITY OF CONTAINERS IN A FIRST AZ OF THE PLURALITY OF AZS, AND LAUNCHING AT LEAST ONE NEW CONTAINER IN A SECOND AZ OF THE PLURALITY OF AZS 508

OPERATIONS
500

LAUNCHING, BY A CONTAINER SERVICE OF A CLOUD PROVIDER NETWORK, A PLURALITY OF CONTAINERS, WHEREIN EACH CONTAINER OF THE PLURALITY OF CONTAINERS IS EXECUTED ON COMPUTING INFRASTRUCTURE WITHIN ONE OF A PLURALITY OF AVAILABILITY ZONES (AZS) OF THE CLOUD PROVIDER NETWORK, AND WHEREIN THE CONTAINER SERVICE PLACES EACH CONTAINER IN A PARTICULAR AZ OF THE PLURALITY OF AZS ACCORDING TO A CONFIGURED PLACEMENT STRATEGY 502

IDENTIFYING AN ACTUAL DISTRIBUTION OF THE PLURALITY OF CONTAINERS ACROSS THE PLURALITY OF AZS 504

DETERMINING THAT THE ACTUAL DISTRIBUTION OF THE PLURALITY OF CONTAINERS DIFFERS FROM AN EXPECTED DISTRIBUTION OF THE PLURALITY OF CONTAINERS BASED ON THE PLACEMENT STRATEGY 506

REBALANCING PLACEMENT OF THE PLURALITY OF CONTAINERS BY: TERMINATING AT LEAST ONE CONTAINER OF THE PLURALITY OF CONTAINERS IN A FIRST AZ OF THE PLURALITY OF AZS, AND LAUNCHING AT LEAST ONE NEW CONTAINER IN A SECOND AZ OF THE PLURALITY OF AZS
508

*FIG. 5*

AUTOMATIC REBALANCING OF CONTAINER-BASED SERVICES FOR HIGH AVAILABILITY

BACKGROUND

Application containerization is a popular type of virtualization technology. Broadly speaking, containerization represents a type of operating system virtualization that allow users to run software applications and their dependencies in resource-isolated processes and in a consistent manner across different types of deployment environments. To enable container-based applications to run consistently across different deployment environments, a container is constructed as an atomic, self-contained package of software that includes everything needed to run the software contained therein (including, for example, any necessary code, libraries, packages, and so forth). The use of containers has become a popular application development and deployment tool in part because containers are often more portable, lightweight, standardized, and easier to deploy in a consistent manner compared to other types of application deployment strategies.

BRIEF DESCRIPTION OF DRAWINGS

Various embodiments in accordance with the present disclosure will be described with reference to the drawings, in which:

FIG. 5 is a flow diagram illustrating operations of a method for periodically rebalancing the placement of containers managed by a container service of a cloud provider network according to a configured placement strategy according to some examples.

DETAILED DESCRIPTION

Figure 1:
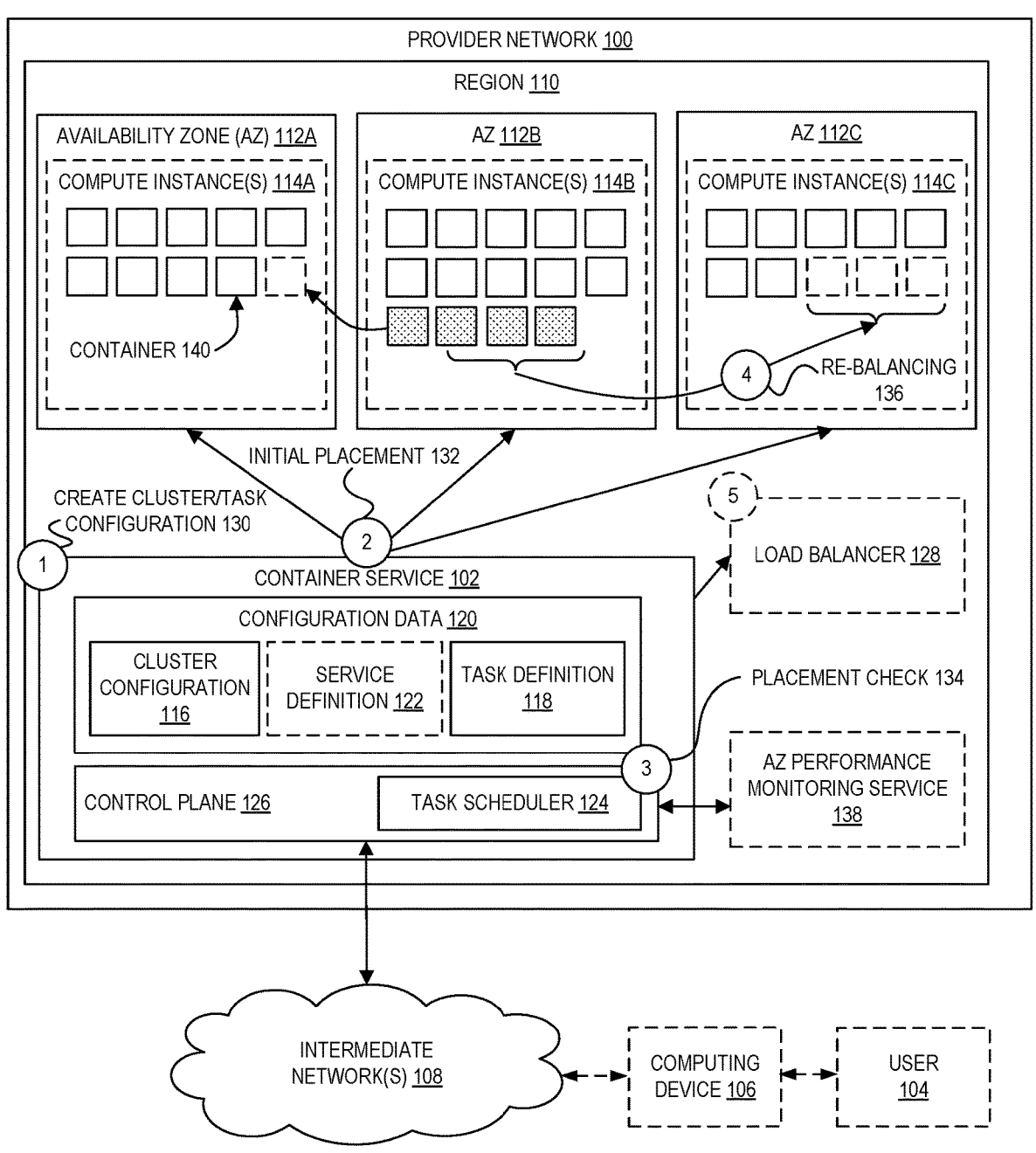
FIG. 1 is a diagram illustrating an environment in which a container service of a cloud provider network periodically rebalances the placement of containers across a plurality of availability zones (AZs) to more closely correspond to an expected distribution of the containers according to a placement strategy configured for the containers according to some examples.

The present disclosure relates to methods, apparatus, systems, and non-transitory computer-readable storage media for enabling a container service of a cloud provider network to periodically rebalance the placement of containers managed by the container service according to configured placement strategies associated with the containers. Many cloud service providers provide one or more container services broadly providing container management functionality that enables users to run, stop, and manage containers on clusters of computing resources used to execute the containers. These container services can launch users' containers according to defined task or service definitions defining characteristics of a containerized application, where a given container executes on computing infrastructure located within one of a plurality of selected availability zones (AZs) of the cloud provider network. A container service can place each container in a particular AZ according to a placement strategy configured in association with a task or service definition, e.g., such as a placement strategy indicating that task instances are to be spread evenly across the AZs for load balancing and availability purposes.

Users running containerized applications with high availability needs may occasionally notice an imbalance in the distribution of containers executing based on an associated task or service definition. These imbalances can anise, e.g., due to an outage or impairment (e.g., a so-called "gray failure") affecting one or more AZs in which containers are running, due to scaling operations and available computing resources in each AZ over time, among other events. In general, a decision concerning where to place newly launched containers is generally performed by a container service only at the time of container launch and typically is not revisited by the container service on an ongoing basis. Imbalances in the distribution of an application or service's containers can increase the susceptibility of users' container-based applications to various outage or performance issues over time.

These challenges, among others, are addressed by enabling a container service to detect imbalances of container placements across a set of AZs and to automatically rebalance placement of the containers, if needed. For example, at some point in time after the container service launches a user's containers based on an associated task or service definition, the container service can periodically identify whether an actual distribution of the containers matches an expected distribution of the task instances according to the placement strategy configured in association with the corresponding task or service definition. As indicated above, an actual distribution of the containers may differ from an expected distribution, e.g., due to outages or other operational issues affecting computing infrastructure in AZs from time to time, based on periodically performed scaling operations increasing or decreasing a total number of deployed containers, and the like. In some examples, responsive to determining that an imbalance in the placement of the containers exists, the container service rebalances placement of the containers by terminating one or more containers in one or more of the AZs (e.g., in an AZ impacted by an outage/impairment or an AZ otherwise containing an overabundance of containers) and launching additional containers in one or more other AZs to restore a closer correspondence to an expected distribution of the containers. Among other benefits, the periodic rebalancing of containers in the manner described herein improves a container-based application's ability to load balance demand for an application and further improves application availability by ensuring sufficient capacity is spread across multiple AZs of a cloud provider network.

FIG. 1 is a diagram illustrating an environment in which a container service of a cloud provider network periodically rebalances the placement of containers managed by the container service according to a configured placement strategy according to some examples. A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc.

These and other computing resources can be provided as services, such as a hardware virtualization service that can execute compute instances, a container service 102 that can orchestrate the deployment and execution of containers, a storage service that can store data objects, etc. The users (or "customers") of provider networks 100 can use one or more user accounts that are associated with a customer account, though these terms can be used somewhat interchangeably depending upon the context of use. Users (e.g., a user 104) can use computing devices (e.g., a computing device 106) interact with a provider network 100 across one or more intermediate networks 108 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions (e.g., region 110 in FIG. 1), where a region is a geographical area in which the cloud provider clusters data centers. Each region includes multiple (e.g., two or more)

availability zones (AZs) (e.g., AZ 112A, AZ 112B, and AZ 112C in the example region 110) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Generally, the traffic and operations of a provider network 100 can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some examples, a container service 102 is a container orchestration and management service (referred to in various implementations as a container service, cloud container service, container engine, or container cloud service) that allows users of the cloud provider network to instantiate and manage containers. A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

As indicated, a container service 102, such as the Amazon Elastic Container Service (ECS)™, may be a highly scalable, high performance container management service that supports containers (e.g., Docker containers) and allows users to easily run applications on a managed cluster of compute instances, eliminating the need for users to install, operate, and scale their own cluster management infrastructure. With simple API calls, users can launch and stop container-enabled applications, query the complete state of their clusters, and utilize provider network features such as virtual firewalls, load balancing, virtual block storage volumes, and Identity Access Management (IAM) roles. Users may use the container service 102 to schedule container placement across a cluster based on their unique resource needs and availability requirements or may integrate their own schedulers or third-party schedulers to meet business or application specific requirements.

To prepare an application to be run using the container service 102, in some examples, a user defines or provisions a cluster, creates a task or service definition corresponding to the application, and optionally provides associated configuration data that the container service 102 can use to manage execution of the user's application. For example, a task or service definition can include the specification of a placement strategy for tasks or services and their associated containers. A placement strategy broadly is an algorithm for selecting compute instances or other computing resources (e.g., compute instance(s) 114A, compute instance(s) 114B, and compute instance(s) 114C, in the example of FIG. 1) for task/container placement or for selecting tasks/containers for termination. In some examples, task placement strategies can include bin packing (e.g., such that containers are placed on compute instances so as to leave the least amount of unused CPU or memory), random placement, or spread placement (e.g., such that containers associated with a task or service are placed evenly across available compute instances, across available AZs, or based on other container instance attributes or combinations thereof).

In some examples, a container service 102 enables users to create "clusters." A cluster is a logical grouping of execution resources that can be used to execute containers associated with one or more associated tasks or services. A user can register one or more compute resources (e.g., compute instances such as VMs, physical computing devices, etc.) with a cluster and, once registered, those compute resources become available to run tasks. A compute instance may be used somewhat synonymously with the term "container instance," though the latter may refer more specifically to an execution resource (e.g., a compute instance or physical host) that is running a container agent, has a container runtime installed, and has been registered with a cluster. In some examples, container instances (e.g., such as compute instance(s) 114A, compute instance(s) 114B, and compute instance(s) 114C in each of AZ 112A, AZ 112B, and AZ 112C) may be hosted within the provider network 100 such as via use of a hardware virtualization service or other computing resources.

Thus, via a console application (e.g., a web-based application or custom application) or API, a user 104 can use a computing device (e.g., computing device 106) to send commands to the container service 102 (including, e.g., a "create-cluster" command) to create or configure a cluster and to associate container instances with the cluster, where those container instances are located in one or more AZs. Metadata provided by the user in the command(s) or generated by the container service 102 may be stored as cluster configuration data 116 including, e.g., a cluster name, identifiers of networking information associated with the cluster such as a subnet or private network that they operate within, tags associated with the cluster, operational configurations such as associated services—e.g., monitoring, auto-scaling—to be enabled for the cluster, etc.

In some examples, a user can install a container agent upon a compute instance or computing device (to qualify it as a "container instance" available for assignment into a cluster), or a compute instance or computing device can be pre-allocated with a container agent by the container service 102 (e.g., by launching a virtual machine compute instance using a machine image having the agent thereupon). Alternatively, or additionally, a new compute instance may be deployed or configured as a container instance when it is added to a cluster, such as via the user submitting a command to both obtain a compute instance (e.g., from a hardware virtualization service) and to add it to the cluster.

A cluster of container instances can thus be used to execute some portion of application code, also referred to herein as a "task." Thus, the term "task" is generally used in a broad manner to refer to a set of computing operations of some type associated with an application. In some examples, a "task" can be a portion of a software application (or the entirety of the application) that can be executed using one or more containers. A user 104 can issue one or more commands (e.g., a "register-task-definition" command) to create a task definition 118 representing a portion of an application the user wishes to run, which can be stored as part of configuration data 120 as task definition 118.

For example, a user 104 can specify parameters to be part of a task definition 118 such as an identifier of a container image to use with each container in the task, amounts and types of computing resources (e.g., CPU, memory, etc.) to use with each task or each container within a task, a launch type to use that identifies the infrastructure on which the tasks are hosted (e.g., a hardware virtualization service, an on-demand serverless execution service, an "external" launch type indicating that the task is to be run on an external container instance that is remote from the service provider network), a logging configuration to use for the tasks, an indicator of whether the task should continue to run if the container finishes or fails, a command that the container should run when it is started, identifiers of any data volumes that should be used with the containers in the task, an IAM role that the tasks should use, etc. A user can optionally define (or include) one or multiple containers in a single task definition. However, a user's entire application stack does not need to be on within a single task definition, and instead the application can span multiple task definitions where the user combines related containers into their own task definitions, each representing a single component of the application.

A task definition can include text data (e.g., in JavaScript Object Notation (JSON) format) that describes one or more containers forming an application. The task definition can be thought of as a blueprint for the application as it specifies various parameters for the application, which can indicate which containers should be used, which ports should be opened for the application, what data volumes should be used with the containers in the task, etc. The specific parameters available for a task definition depend on the needs of the specific application. A "task instance" (or just "task") may thus represent the instantiation of a task definition within a cluster. After a user has created a task definition for an application, the user can specify the number of tasks to run on the cluster.

Similarly, users can provide configuration data to define services as part of a service definition 122, where a service is an abstraction related to long running applications that allows the user to run and maintain a specified number of instances of a task definition simultaneously. Thus, if any of the tasks of a cluster should fail or stop for any reason, the container service 102 can launch another instance of the task definition to replace it in order to maintain a desired number of tasks in the service. In some examples, a service can also run behind a load balancer (e.g., a load balancer 128) that distributes request traffic across the tasks that are associated with a service.

With this configuration data 120, a container task scheduler 124 (of the control plane 126 of the container service 102) is responsible for placing tasks within a cluster. There are several different scheduling options that may be used, for example, a user can define a service that runs and maintains a specified number of tasks simultaneously. As indicated above, a task scheduler 124 can also place container instances at particular locations within a cluster according to a defined placement strategy.

As described herein, a container agent is a software module that runs on each compute instance within a cluster and can send information to the control plane 126 about the instance's current running tasks, resource utilization amounts (e.g., CPU, memory, networking), etc., and can start and stop tasks whenever it receives a request to do so from the control plane. Thus, it may perform local actions under the control of the control plane 126 (e.g., responsive to commands sent by the control plane or configurations initiated from the control plane) and can report back metadata to the control plane 126 or a separate monitoring or logging service of the provider network 100.

As indicated above, in addition to the initial placement of tasks/containers upon container launch or termination, it is desirable in many cases to rebalance the placement of tasks/containers over time. FIG. 1 includes a series of numbered circles "1"-"5" illustrating an example process for rebalancing placement of containers by a container service 102. In some examples, at circle "1" in FIG. 1, the container service 102 receives a request 130 to create a cluster configuration and a task or service definition. As indicated previously, a task or service definition can include, e.g., the identification of one or more container images, a type of container execution environment, a type of operating system and CPU architecture for the task, a task size (e.g., specified by CPU and memory values to reserve for the task), a container size (e.g., specified as an amount of memory to present to the container and the number of CPU units to reserve for the container), optional task roles, network modes, storage settings, log collection settings, etc. Responsive to receiving the request, in some examples, the container service 102 generates configuration data 120 corresponding to the task or service definition and stores the task or service definition data in association with a user account responsible for the request.

In some examples, the configuration of a task or service definition can include configuration of a cluster comprising compute resources located in one or more AZs of the provider network 100. For example, the cluster of compute instance(s) 114A, 114B, and 114C in FIG. 1 is located on infrastructure in each of AZs 112A, 112B, and 112C within a region 110. In other examples, a cluster can include compute resources located in more or fewer AZs within a region and possibly across multiple separate regions of the provider network 100. The configuration of a service or task can further optionally include configuration of a load balancer 128 used to distribute incoming application requests across the containers deployed within a defined cluster.

In some examples, at circle "2," the container service 102 launches a plurality of containers (or task instances) based on the configured task or service definition and cluster configuration over time, shown as initial placement 132. As indicated, a task instance involves execution of a container-based software application on computing infrastructure within one of a plurality of AZs of the cloud provider network 100 configured for an associated cluster. For example, a container 140 represents a container launched by the container service 102 on a compute instance 114A running on infrastructure located in the availability zone 112A (where each individual square represents a separate container launched based on a same task or service defini-tion). The containers can be launched over time responsive to individual launch requests, based on a task scheduler 124 launching and terminating tasks based on various condi-tions, based on automated scaling operations used to ensure that a sufficient number of containers are executing to satisfy demand, or combinations thereof.

As indicated, in some examples, the container service 102 places each task instance in a particular AZ of the AZs available to the cluster according to a placement strategy configured for the task definition. In the example of FIG. 1, the initial placement 132 of the containers is performed based on a spread placement strategy configured relative to a set of AZs in which infrastructure has been assigned to a cluster (in this example, the set of AZs including AZ 112A, 112B, and 112C). In other examples, a cluster can be associated with more or fewer AZs and may include infra-structure in AZs distributed across more than one region. Over time, however, the distribution of the containers can become imbalanced due to AZ outages/impairments, scaling operations, and the like. As shown in FIG. 1, at some point in time, the compute instance(s) 114B located in AZ 112B are hosting a larger number of containers compared to either AZ 112A or AZ 112C (where the squares representing excess containers are shown with shaded filling).

In some examples, at circle "3," the container service 102 performs a placement check 134 to identify an actual distribution of containers across the plurality of AZ associ-ated with the cluster. The task scheduler 124 can perform the placement check 134 responsive to any of several different events including, for example, a user request to perform a check of the distribution of the user's containers, a user request to remove or "evacuate" containers currently located in one or more AZs (e.g., a request to "taint" one or more AZs due to performance or other concerns with the AZs), an indication from an AZ performance monitoring service 138 identifying an outage or impairment affecting one more AZs, a periodic schedule defined by the task scheduler 124 or a user associated with the containers, and the like.

As indicated, in some examples, the rebalancing of con-tainers deployed within a cluster can be initiated based at least in part on a signal received from an AZ performance monitoring service 138. The AZ performance monitoring service 138, for example, broadly represents any service or component capable of monitoring the health and perfor-mance of the infrastructure provided by the provider net-work 100 across any number of AZs and regions. The AZ performance monitoring service 138 can periodically or continuously monitor for complete AZ outages, for perfor-mance degradations (e.g., based on monitoring network conditions, computing resource utilization, or other mea-surements of application performance within the AZ or within a particular cluster), or other measurements or events affecting AZ performance. In some examples, the AZ per-formance monitoring service 138 provides API endpoints that the container service 102 can query to obtain AZ health and performance information. The AZ performance moni-toring service 138 can additionally, or alternatively, provide event-based notifications of notable changes to the condition of one or more AZs to the container service 102, to other components of the provider network 100, and optionally to external devices. In this manner, the AZ performance moni-toring service 138 can be used by the container service 102 to identify instances in which the performance of a cluster may be benefited by "evacuating" containers from an AZ experiencing an outage or performance issues to one or more other healthier AZs. The evacuation of containers from an AZ is described in more detail elsewhere herein with respect to FIG. 2.

In some examples, at circle "4" in FIG. 1, the container service 102 determines that the actual distribution of the plurality of task instances differs from an expected distri-bution of the plurality of task instances based on the place-ment strategy configured for an associated task or service definition and initiates rebalancing actions 136. For example, determining, the determination can include the container service identifying a number of healthy containers running in each of the plurality of AZs (e.g., based on information provided by container agents running on the compute instances hosting the containers) and comparing the number of healthy containers running in each AZ to an expected distribution (e.g., a roughly equal distribution in the case of a spread placement strategy). The container service 102 can use a degree to which each the number of containers in each AZ diverges from an expected distribu-tion, e.g., to determine a number of containers to terminate in one more AZs and to launch in one or more other AZs of the associated cluster.

In the example of FIG. 1, the container service 102 determines that the AZ 112B contains an overabundance of containers compared to AZ 112A and AZ 112B. Accord-ingly, the container service 102 sends instructions to con-tainer agents running on compute instance(s) 114B to ter-minate some number of containers (e.g., the containers represented by shaded squares) and launches one or more corresponding containers in other AZs (e.g., represented by the dashed squares in AZ 112A and AZ 112C). In this manner, a balance of the containers across the AZs of the clusters is achieved after the initial placement determina-tions made by the task scheduler 124 and other components.

In some examples, at circle "5," the container service 102 optionally provides instructions to an associated load bal-ancer 128 to re-balance traffic to the containers based on the rebalancing actions 136. In the example of FIG. 1, the load balancer 128 can use the instructions to more evenly balance application traffic across AZ 112A, 112B, and 112C to account for the more even distribution of containers across those AZs.

Figure 2:
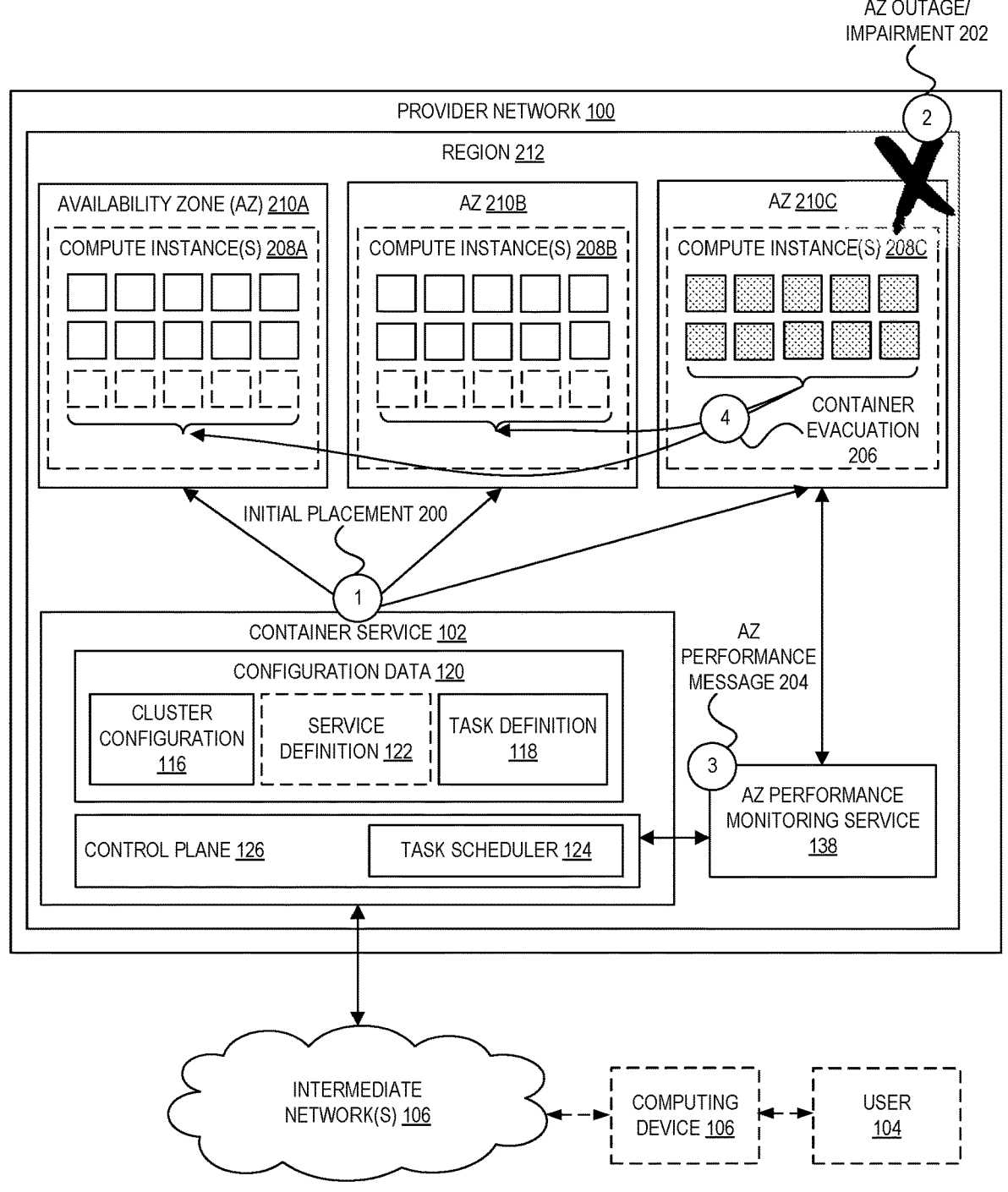
FIG. 2 is a diagram illustrating a container service identifying an operational issue affecting an AZ in which containers have been deployed and rebalancing the placement of containers in part by evacuating containers previously launched in the affected AZ to one or more other AZs according to some examples.

FIG. 2 is a diagram illustrating a container service iden-tifying an operational issue affecting an AZ in which con-tainers have been deployed and rebalancing the placement of containers in part by evacuating containers previously launched in the affected AZ to one or more other AZs according to some examples. As indicated above, one signal that may cause a container service 102 to initiate rebalancing is information obtained from an AZ performance monitoring service 138 indicating an outage or impairment affecting an AZ in which containers have been previously deployed.

At circle "1" in FIG. 2, the container service 102 performs an initial placement 200 of containers across AZ 210A, 210B, and 210C and compute instance(s) 208A, compute instance(s) 208B, and compute instance(s) 208C in a region 212. At some point in time, the AZ 210C is impacted by an AZ failure or impairment 202. For example, the infrastructure in the AZ may temporarily become unavailable due to mechanical failures, natural disasters, or the like, or performance of computing infrastructure within the AZ may become degraded due to operational issues, software bugs, etc. In this example, the AZ performance monitoring service 138 detects the outage or impairments (e.g., by performing periodic health and performance checks on the status of computing infrastructures in each of the AZs) and, at circle "3," generates an AZ performance message 204 indicating the impairment or outage affecting AZ 210C. The container service 102 can obtain the AZ performance message 204, e.g., by periodically polling the AZ performance monitoring service 138 or in an event-driven manner from the AZ performance monitoring service 138 (e.g., based on a pub-sub messaging system).

In some examples, at circle "4" in FIG. 2, responsive to obtaining the information indicating the outage or impairment, the container service 102 initiates rebalancing actions to evacuate containers running in the affected AZ 210C. As illustrated, the container service 102 can send instructions to container agents running on compute instance(s) 208C to terminate the containers (if the container agents are reachable; otherwise, the container service 102 can assume the containers are terminated) and send corresponding instructions to container agents running on compute instance(s) 208A and 208B to launch new containers to replace those in AZ 210C. In this manner, the containers in AZ 210C (shown as shaded squares) are automatically evacuated 206 to other healthy AZs of the cluster.

Figure 3:
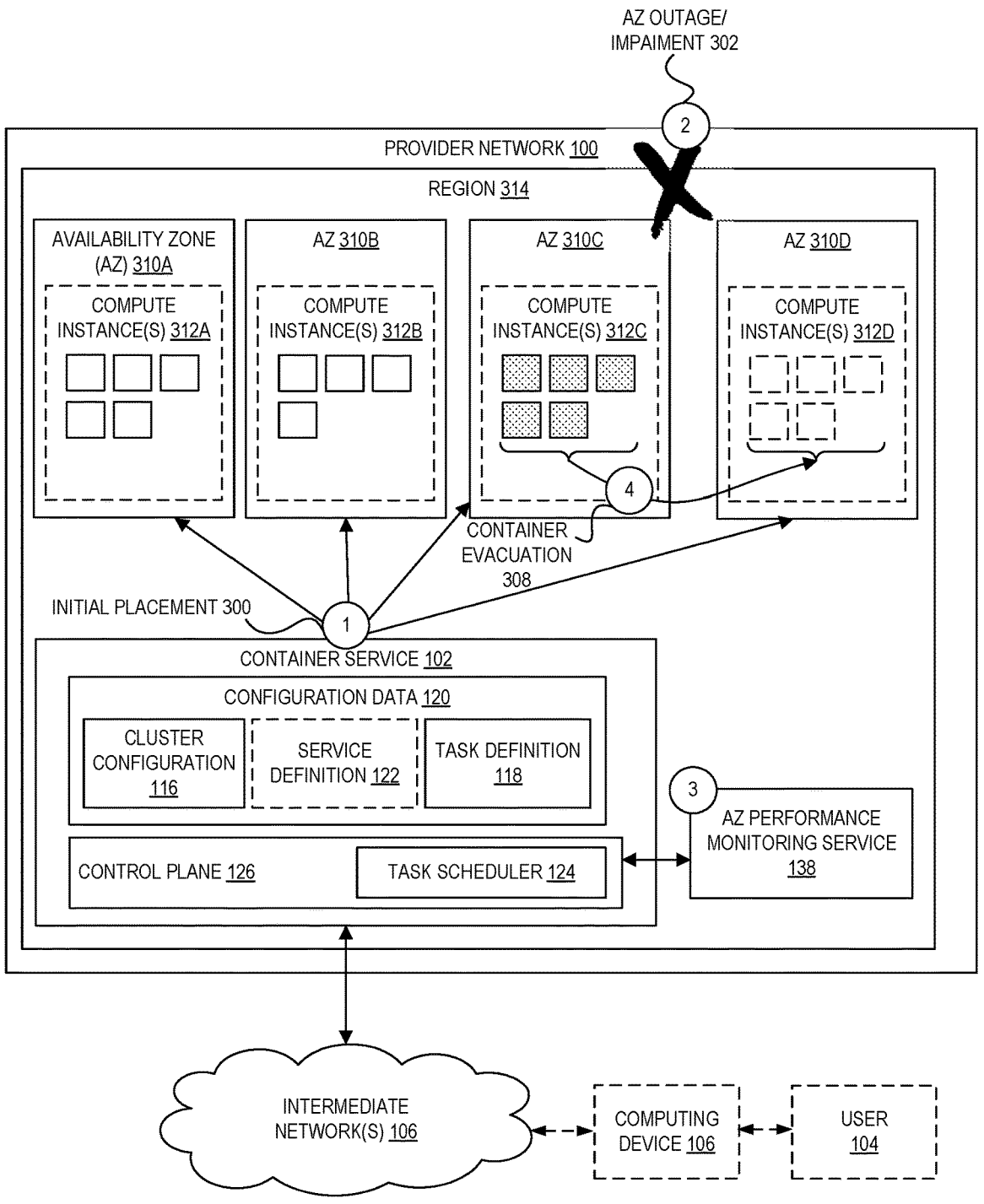
FIG. 3 is a diagram illustrating a container service evacuating containers previously launched in an AZ affected by an operational issue to an AZ added to a set of possible AZs into which containers can be launched according to some examples.

In the example shown in FIG. 2, the containers running in an AZ impacted by an outage or impairment are evacuated to other AZs of the cluster. In other examples, a container service 102 can evacuate containers running in an impacted AZs to computing infrastructure launched in a new AZ to be added to a cluster supporting a containerized task or service. FIG. 3 is a diagram illustrating a container service evacuating containers previously launched in an AZ affected by an operational issue to an AZ added to a set of possible AZs into which containers can be launched according to some examples.

As shown in FIG. 3, at circle "1," the container service 102 performs initial placement 300 of containers across AZs 310A, 310B, and 310C and on corresponding compute instance(s) 312A, compute instance(s) 312B, compute instance(s) 312C over time in a region 314. At circle "2," the AZ 310C is impacted by an outage/impairment 302 which, at circle "3," is detected by the AZ performance monitoring service 138 and communicated to the container service 102. In this example, instead of redistributing the containers across only AZ 310A and 310B originally configured for the cluster, the container service 102 launches new compute instance(s) 312D in a different AZ 310D. The container service 102 then performs actions to evacuate 308 the containers in the impacted AZ 310C to the computing resources launched in the AZ 310D. In this manner, the container service 102 can maintain a distribution of the containers across an equal number of AZs for redundancy purposes.

Figure 4:
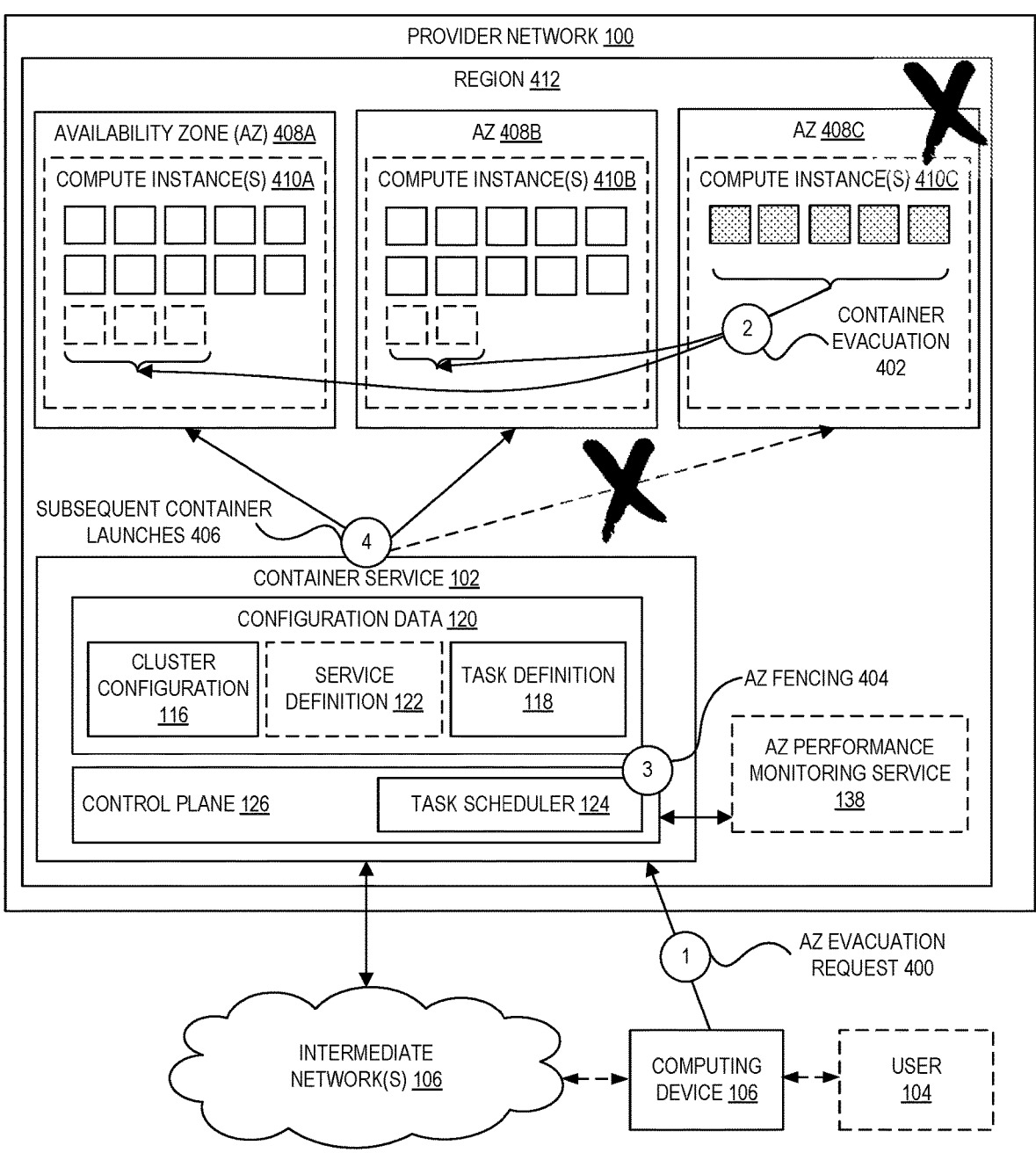
FIG. 4 is a diagram illustrating a container service fencing off an AZ from subsequent container launches according to some examples.

FIG. 4 is a diagram illustrating a container service fencing off an AZ from subsequent container launches according to some examples. For example, once a container service 102 has identified that an AZ is impacted by an outage or impairment, or responsive to the container service 102 receiving a user request to evacuate containers from a particular AZ, the container service 102 con "fence" the AZ off from subsequent container placements. As shown, a container service has initially placed containers across AZs 408A, 408B, and 408C and on corresponding compute instance(s) 410A, compute instance(s) 410B, and compute instance(s) 410C in a region 412.

As shown in FIG. 4, at circle "1," the container service 102 receives an AZ evacuation request 400 from a computing device 106 requesting the evacuation of containers running in an identified AZ 408C. For example, a user 104 might generate the request responsive to the user determining that performance of containers in the AZ has degraded or for any other reason. Responsive to the request, at circle "2," the container service 102 performs actions to evacuate 206 containers from the AZ 408C to other AZs of the cluster, as described above.

In some examples, following the evacuation of the containers, at circle "3," the container service 102 further stores data indicating that the AZ 408C is no longer an available destination for future container launches based on a task or service definition associated with the user request, shown as AZ fencing 402. In some examples, based on the data stored indicating the fencing off of AZ 408C, at circle "4," the container service 102 places subsequent container launches 406 into only one of either AZ 408A or AZ 408B. Although the example shown in FIG. 4 illustrates the fencing of an AZ responsive to a user request, in other examples, the container service 102 can automatically fence an AZ from subsequent container launches based on determining that an AZ is experiencing an outage or impairment or based on other conditions. In some examples, an AZ that was previously fenced off from container placements can be un-fenced responsive to a subsequent user request or responsive to determining that conditions impacting an AZ have been resolved. Although FIG. 4 illustrates an example of fencing a single AZ, in other examples, users can optionally request to fence off two or more AZs of a cluster, if desired.

Some of the examples described herein involve rebalancing containers for spread across a collection of AZs of a cloud provider network. In some scenarios, a user can additionally or alternatively configure a placement strategy based on maximizing utilization of the hardware resources used to host a users' containers. In these examples, an approach similar to that used to rebalance containers across AZs can be used to periodically rebalance containers in a manner that maximizes task density on the underlying compute instances used to execute the containers. A container service can, for example, track the distribution of containers against a utilization target or can otherwise attempt to maximize a ratio of containers to VMs used to host those containers.

As yet another example, a container service can periodically rebalance containers with the desired outcome of collocating the containers with a desired resource (e.g., with one or more database instances used by the containers). In this example, the container service can seek to rebalance containers in a manner that minimizes network latency for database calls per task or that otherwise minimizes latency to a resource. In examples where containers are executing in computing environments extending a cloud provider network (e.g., in networks outside of a cloud provider network but controlled by a control plane of the cloud provider network), a container service can rebalance containers to computing devices running in such locations to those that are nearest to upstream consuming services or downstream sources.

FIG. 5 is a flow diagram illustrating operations 500 of a method for periodically rebalancing the placement of containers managed by a container service of a cloud provider network according to a configured placement strategy according to some examples. Some or all of the operations 500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 500 are performed by a container service 102 of the other figures.

The operations 500 include, at block 502, launching, by a container service of a cloud provider network, a plurality of containers, wherein each container of the plurality of containers is executed on computing infrastructure within one of a plurality of availability zones (AZs) of the cloud provider network, and wherein the container service places each container in a particular AZ of the plurality of AZs according to a configured placement strategy.

The operations 500 further include, at block 504, identifying an actual distribution of the plurality of containers across the plurality of AZs.

The operations 500 further include, at block 506, determining that the actual distribution of the plurality of containers differs from an expected distribution of the plurality of containers based on the placement strategy.

The operations 500 further include, at block 508, rebalancing placement of the plurality of containers by: terminating at least one container of the plurality of containers in a first AZ of the plurality of AZs, and launching at least one new container in a second AZ of the plurality of AZs.

In some examples, the operations further include identifying an operational issue affecting the first AZ, wherein the operational issue affects performance of containers placed by the container service in the first AZ; and wherein rebalancing placement of the plurality of containers is performed responsive to identifying the operational issue affecting the first AZ.

In some examples, the plurality of containers are associated with a task or service definition defining parameters for launching the plurality of containers, and the operations further include: identifying an operational issue affecting the first AZ, wherein the operational issue affects performance of containers placed by the container service in the first AZ; removing the first AZ affected by the operational issue from the plurality of AZs at which containers associated with the task or service definition can be placed to obtain an updated plurality of AZs; and launching a new container based on the task or service definition, wherein the container service places the new container in an AZ from the updated plurality of AZs.

In some examples, the operations further include obtaining, from an AZ performance monitoring service, an indication of an operational issue affecting the first AZ, wherein the AZ performance monitoring service identifies the operational issue affecting the first AZ based on at least one of: availability of the computing infrastructure in the first AZ, network latency measurements obtained from the first AZ, or compute performance measurements obtained from the first AZ; and wherein rebalancing placement of the plurality of containers is performed responsive to obtaining the indication of the operational issue affecting the first AZ from the AZ performance monitoring service.

In some examples, the plurality of containers are associated with a task or service definition defining parameters for launching the plurality of containers, and the operations further include: receiving a request to exclude the first AZ from the plurality of AZs as a possible destination for the container service to launch containers based on the task or service definition; and wherein rebalancing placement of the plurality of containers is performed responsive to the request to exclude the first AZ.

In some examples, a load balancer distributes application traffic to the plurality of containers, and wherein the operations further include sending, to the load balancer, instructions to update the distribution of application traffic based on the rebalanced placement of the plurality of containers.

In some examples, the placement strategy is a spread placement strategy, and wherein the spread placement strategy causes the container service to spread placement of containers across the plurality of AZs.

In some examples, the operations further include receiving a request to create a task or service definition, wherein the task or service definition identifies a container image used to execute the plurality of containers; and wherein the container service launches the plurality of containers based on the task or service definition.

In some examples, the operations further include obtaining, from a plurality of software agents running on compute instances hosting the plurality of containers, data indicating a status of each of the plurality of containers; and wherein determining the actual distribution of the plurality of containers across the plurality of AZs is based at least in part on the data obtained from the plurality of software agents.

In some examples, the operations further include determining, by the container service, a number of healthy containers running in each of the plurality of AZs; and wherein rebalancing placement of the plurality of containers further includes determining a number of containers to be launched or terminated in each of the plurality of AZs based on the number of healthy containers running in each of the plurality of AZs.

In some examples, the plurality of containers are associated with a task or service definition defining parameters for launching the plurality of containers, and the operations further include: identifying an operational issue affecting the first AZ, wherein the operational issue affects performance of containers placed by the container service in the first AZ; modifying the plurality of AZs at which containers associated with the task or service definition can be placed by removing the first AZ affected by the operational issue from the plurality of AZs and adding an additional AZ to the plurality of AZs; and launching a new container based on the task or service definition, wherein the container service places the new container in the additional AZ.

Figure 6:
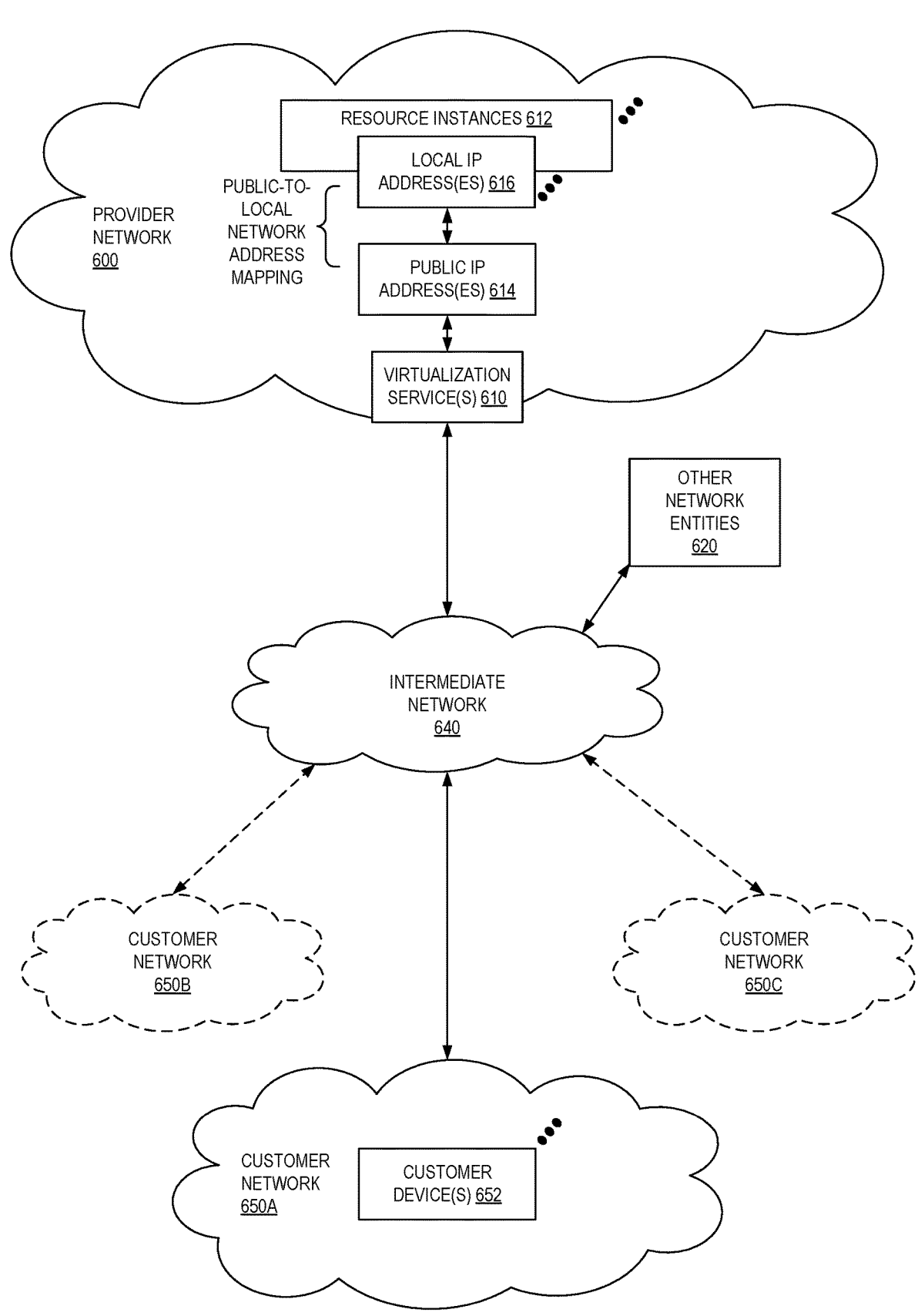
FIG. 6 illustrates an example provider network environment according to some embodiments.

FIG. 6 illustrates an example provider network (or "service provider system") environment according to some embodiments. A provider network 600 can provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 can be associated with the resource instances 612; the local IP addresses are the internal network addresses of the resource instances 612 on the provider network 600. In some embodiments, the provider network 600 can also provide public IP addresses 614 and/or public IP address ranges (e.g., Internet Protocol version 4 (IPv4) or Internet Protocol version 6 (IPv6) addresses) that customers can obtain from the provider 600.

Conventionally, the provider network 600, via the virtualization services 610, can allow a customer of the service provider (e.g., a customer that operates one or more customer networks 650A-650C (or "client networks") including one or more customer device(s) 652) to dynamically associate at least some public IP addresses 614 assigned or allocated to the customer with particular resource instances 612 assigned to the customer. The provider network 600 can also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of the customer network(s) 650A-650C can, for example, implement customer-specific applications and present the customer's applications on an intermediate network 640, such as the Internet. Other network entities 620 on the intermediate network 640 can then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 can be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 600; a customer can then assign their allocated public IP addresses to particular resource instances allocated to the customer. These public IP addresses can be referred to as customer public IP addresses, or simply customer IP addresses. Instead of being assigned by the provider network 600 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
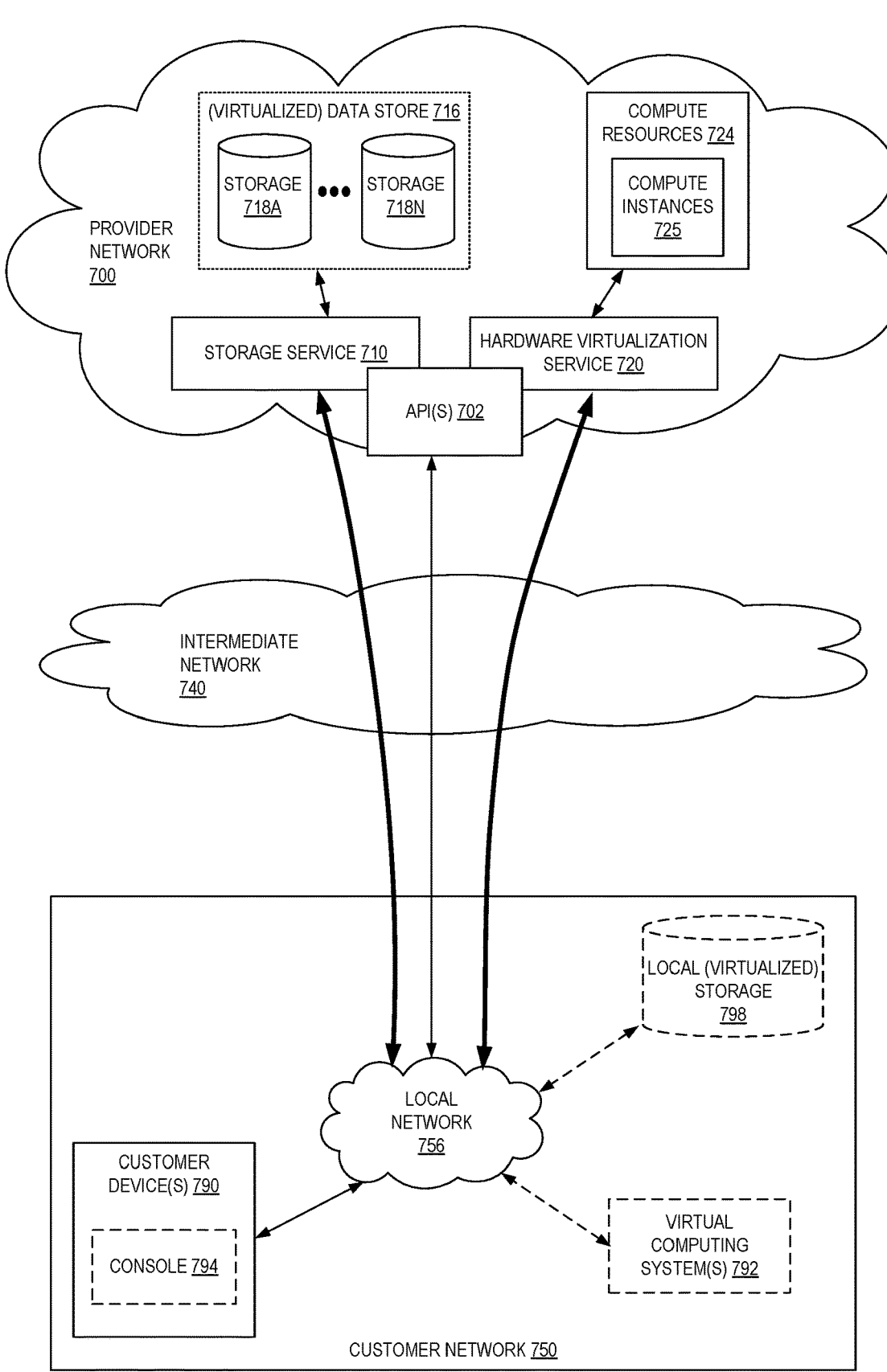
FIG. 7 is a block diagram of an example provider network that provides a storage service and a hardware virtualization service to customers according to some embodiments.

FIG. 7 is a block diagram of an example provider network environment that provides a storage service and a hardware virtualization service to customers, according to some embodiments. A hardware virtualization service 720 provides multiple compute resources 724 (e.g., compute instances 725, such as VMs) to customers. The compute resources 724 can, for example, be provided as a service to customers of a provider network 700 (e.g., to a customer that implements a customer network 750). Each computation resource 724 can be provided with one or more local IP addresses. The provider network 700 can be configured to route packets from the local IP addresses of the compute resources 724 to public Internet destinations, and from public Internet sources to the local IP addresses of the compute resources 724.

The provider network 700 can provide the customer network 750, for example coupled to an intermediate network 740 via a local network 756, the ability to implement virtual computing systems 792 via the hardware virtualization service 720 coupled to the intermediate network 740 and to the provider network 700. In some embodiments, the hardware virtualization service 720 can provide one or more APIs 702, for example a web services interface, via which the customer network 750 can access functionality provided by the hardware virtualization service 720, for example via a console 794 (e.g., a web-based application, standalone application, mobile application, etc.) of a customer device 790. In some embodiments, at the provider network 700, each virtual computing system 792 at the customer network 750 can correspond to a computation resource 724 that is leased, rented, or otherwise provided to the customer network 750.

From an instance of the virtual computing system(s) 792 and/or another customer device 790 (e.g., via console 794), the customer can access the functionality of a storage service 710, for example via the one or more APIs 702, to access data from and store data to storage resources 718A-718N of a virtual data store 716 (e.g., a folder or "bucket," a virtualized volume, a database, etc.) provided by the provider network 700. In some embodiments, a virtualized data store gateway (not shown) can be provided at the customer network 750 that can locally cache at least some data, for example frequently accessed or critical data, and that can communicate with the storage service 710 via one or more communications channels to upload new or modified data from a local cache so that the primary store of data (the virtualized data store 716) is maintained. In some embodiments, a user, via the virtual computing system 792 and/or another customer device 790, can mount and access virtual data store 716 volumes via the storage service 710 acting as a storage virtualization service, and these volumes can appear to the user as local (virtualized) storage 798.

While not shown in FIG. 7, the virtualization service(s) can also be accessed from resource instances within the provider network 700 via the API(s) 702. For example, a customer, appliance service provider, or other entity can access a virtualization service from within a respective virtual network on the provider network 700 via the API(s) 702 to request allocation of one or more resource instances within the virtual network or within another virtual network.

Figure 8:
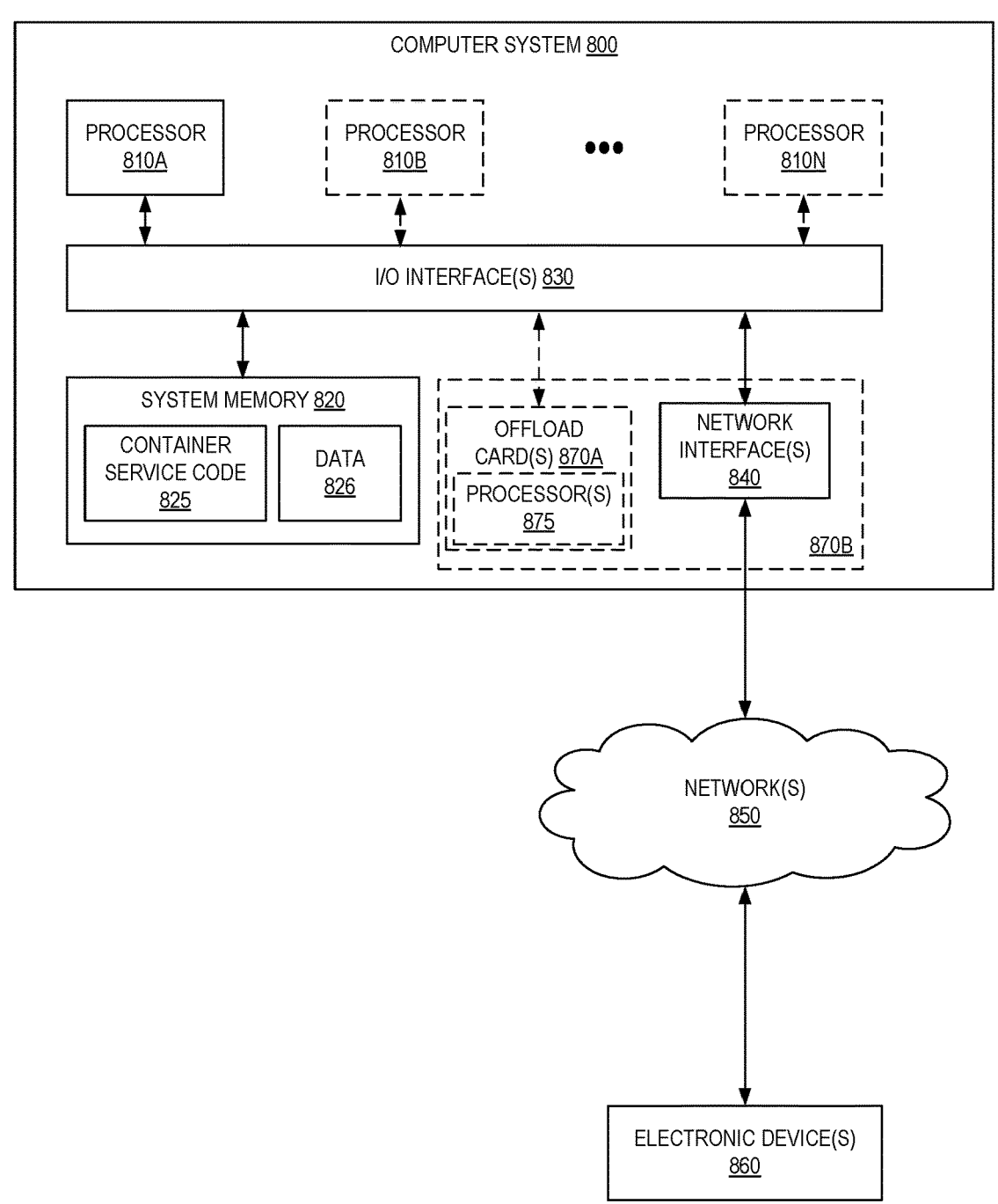
FIG. 8 is a block diagram illustrating an example computer system that can be used in some embodiments.

In some embodiments, a system that implements a portion or all of the techniques described herein can include a general-purpose computer system, such as the computer system 800 illustrated in FIG. 8, that includes, or is configured to access, one or more computer-accessible media. In the illustrated embodiment, the computer system 800 includes one or more processors 810 coupled to a system memory 820 via an input/output (I/O) interface 830. The computer system 800 further includes a network interface 840 coupled to the I/O interface 830. While FIG. 8 shows the computer system 800 as a single computing device, in various embodiments the computer system 800 can include one computing device or any number of computing devices configured to work together as a single computer system 800.

In various embodiments, the computer system 800 can be a uniprocessor system including one processor 810, or a multiprocessor system including several processors 810 (e.g., two, four, eight, or another suitable number). The processor(s) 810 can be any suitable processor(s) capable of executing instructions. For example, in various embodiments, the processor(s) 810 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 810 can commonly, but not necessarily, implement the same ISA.

The system memory 820 can store instructions and data accessible by the processor(s) 810. In various embodiments, the system memory 820 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 820 as container service code 825 (e.g., executable to implement, in whole or in part, the container service 102) and data 826.

In some embodiments, the I/O interface 830 can be configured to coordinate I/O traffic between the processor 810, the system memory 820, and any peripheral devices in the device, including the network interface 840 and/or other peripheral interfaces (not shown). In some embodiments, the I/O interface 830 can perform any necessary protocol, timing, or other data transformations to convert data signals from one component (e.g., the system memory 820) into a format suitable for use by another component (e.g., the processor 810). In some embodiments, the I/O interface 830 can include support for devices attached through various types of peripheral buses, such as a variant of the Peripheral Component Interconnect (PCI) bus standard or the Universal Serial Bus (USB) standard, for example. In some embodiments, the function of the I/O interface 830 can be split into two or more separate components, such as a north bridge and a south bridge, for example. Also, in some embodiments, some or all of the functionality of the I/O interface 830, such as an interface to the system memory 820, can be incorporated directly into the processor 810.

The network interface 840 can be configured to allow data to be exchanged between the computer system 800 and other devices 860 attached to a network or networks 850, such as other computer systems or devices as illustrated in FIG. 1, for example. In various embodiments, the network interface 840 can support communication via any suitable wired or wireless general data networks, such as types of Ethernet network, for example. Additionally, the network interface 840 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 800 includes one or more offload cards 870A or 870B (including one or more processors 875, and possibly including the one or more network interfaces 840) that are connected using the I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 can act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some embodiments the offload card(s) 870A or 870B can perform compute instance management operations, such as pausing and/or un-pausing compute instances, launching and/or terminating compute instances, performing memory transfer/copying operations, etc. These management operations can, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and cannot coordinate with (or service) any separate hypervisor.

In some embodiments, the system memory 820 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 800 via the I/O interface 830. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 800 as the system memory 820 or another type of memory. Further, a computer-accessible medium can include transmission media or signals such as electrical, electromagnetic, or digital signals, conveyed via a communication medium such as a network and/or a wireless link, such as can be implemented via the network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional aspects that add additional features to some embodiments. However, such notation should not be taken to mean that these are the only options or optional operations, and/or that blocks with solid borders are not optional in certain embodiments.

Reference numerals with suffix letters (e.g., 718A-718N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
launching, by a container service of a cloud provider network, a plurality of containers, wherein the plurality of containers is associated with a task or service definition, wherein each container of the plurality of containers is executed on computing infrastructure within one of a plurality of availability zones (AZs) of the cloud provider network, and wherein the container service places each container in a particular AZ of the plurality of AZs according to a placement strategy;
identifying an actual distribution of the plurality of containers across the plurality of AZs;
determining that the actual distribution of the plurality of containers across the plurality of AZs differs from an expected distribution of the plurality of containers across the plurality of AZs based on the placement strategy;
rebalancing placement of the plurality of containers;
identifying an operational issue affecting a first AZ of the plurality of AZs, wherein the operational issue affects performance of containers placed by the container service in the first AZ;
removing one or more containers of the plurality of containers from the first AZ; and
launching a new container based on the task or service definition, wherein the container service places the new container in an AZ of the plurality of AZs other than the first AZ.

2. The computer-implemented method of claim 1, wherein rebalancing placement of the plurality of containers is performed responsive to identifying the operational issue affecting the first AZ.

3. The computer-implemented method of claim 1, comprising:
removing the first AZ affected by the operational issue from the plurality of AZs at which containers associated with the task or service definition can be placed to obtain an updated plurality of AZs; and
launching a new container based on the task or service definition, wherein the container service places the new container in an AZ from the updated plurality of AZs.

4. The computer-implemented method of claim 1, further comprising:
obtaining, from an AZ performance monitoring service, an indication of the operational issue affecting the first AZ, wherein the AZ performance monitoring service identifies the operational issue affecting the first AZ based on at least one of: availability of the computing infrastructure in the first AZ, network latency measurements obtained from the first AZ, or compute performance measurements obtained from the first AZ; and
wherein rebalancing placement of the plurality of containers is performed responsive to obtaining the indication of the operational issue affecting the first AZ from the AZ performance monitoring service.

5. The computer-implemented method of claim 1, wherein a load balancer distributes application traffic to the plurality of containers, and wherein the method further comprises sending, to the load balancer, instructions to update the distribution of application traffic based on the rebalanced placement of the plurality of containers.

6. The computer-implemented method of claim 1, wherein the placement strategy is a spread placement strategy, and wherein the spread placement strategy causes the container service to spread placement of containers across the plurality of AZs.

7. The computer-implemented method of claim 1, wherein the task or service definition identifies a container image used to execute the plurality of containers, and wherein the container service launches the plurality of containers based on the task or service definition.

8. The computer-implemented method of claim 1, further comprising:

obtaining, from a plurality of software agents running on compute instances hosting the plurality of containers, data indicating a status of each of the plurality of containers; and wherein determining the actual distribution of the plurality of containers across the plurality of AZs is based at least in part on the data obtained from the plurality of software agents.

9. The computer-implemented method of claim 1, further comprising:

determining, by the container service, a number of healthy containers running in each of the plurality of AZs; and wherein rebalancing placement of the plurality of containers further includes determining a number of containers to be launched or terminated in each of the plurality of AZs based on the number of healthy containers running in each of the plurality of AZs.

10. A system comprising:

a first one or more electronic devices to implement a container service in a multi-tenant provider network, wherein the container service includes instructions that upon execution cause the container service to:

launch a plurality of containers, wherein each container of the plurality of containers is executed on computing infrastructure within one of a plurality of availability zones (AZs) of the multi-tenant provider network, and wherein the container service places each container in a particular AZ of the plurality of AZs according to a placement strategy, identify an actual distribution of the plurality of containers across the plurality of AZs, determine that the actual distribution of the plurality of containers differs from an expected distribution of the plurality of containers based on the placement strategy, and rebalance placement of the plurality of containers by:

terminating at least one container of the plurality of containers in a first AZ of the plurality of AZs, and launching at least one new container in a second AZ of the plurality of AZs; and a second one or more electronic devices to implement an AZ performance monitoring service in the multi-tenant provider network, wherein the AZ performance monitoring service including instructions that upon execution cause the AZ performance monitoring service to:

identify an operational issue affecting the first AZ, wherein the operational issue affects performance of containers placed by the container service in the first AZ, and provide data identifying the operational issue affecting the first AZ to the container service.

11. The system of claim 10, wherein the plurality of containers are associated with a task or service definition defining parameters for launching the plurality of containers, wherein the container service further includes instructions that upon execution cause the container service to:

remove the first AZ affected by the operational issue from the plurality of AZs at which containers associated with the task or service definition can be placed to obtain an updated plurality of AZs; and launch a new container based on the task or service definition, wherein the container service places the new container in an AZ from the updated plurality of AZs.

12. The system of claim 10, wherein the plurality of containers are associated with a task or service definition defining parameters for launching the plurality of containers, and wherein container service further includes instructions that upon execution cause the container service to:

receive a request to exclude the first AZ from the plurality of AZs as a possible destination for the container service to launch containers based on the task or service definition; and wherein rebalancing placement of the plurality of containers is performed responsive to the request to exclude the first AZ.

13. The system of claim 10, wherein a load balancer distributes application traffic to the plurality of containers, and wherein the container service further includes instructions that upon execution cause the container service to send, to the load balancer, instructions to update the distribution of application traffic based on the rebalanced placement of the plurality of containers.

14. The system of claim 10, wherein the placement strategy is a spread placement strategy, and wherein the spread placement strategy causes the container service to spread placement of containers across the plurality of AZs.

15. The system of claim 10, wherein the container service further includes instructions that upon execution cause the container service to:

obtain, from a plurality of software agents running on compute instances hosting the plurality of containers, data indicating a status of each of the plurality of containers; and wherein determining the actual distribution of the plurality of containers across the plurality of AZs is based at least in part on the data obtained from the plurality of software agents.

16. A computer-implemented method comprising:

launching, by a container service of a cloud provider network, a plurality of containers, wherein the plurality of containers is associated with a task or service definition defining parameters for launching the plurality of containers, wherein each container of the plurality of containers is executed on computing infrastructure within one of a plurality of availability zones (AZs) of the cloud provider network, and wherein the container service places each container in a particular AZ of the plurality of AZs according to a placement strategy;

identifying an actual distribution of the plurality of containers across the plurality of AZs;

determining that the actual distribution of the plurality of containers across the plurality of AZs differs from an expected distribution of the plurality of containers across the plurality of AZs based on the placement strategy;

receiving a request to exclude the first AZ from the plurality of AZs as a possible destination for the container service to launch containers based on the task or service definition; and responsive to the request to exclude the first AZ, rebalancing placement of the plurality of containers by:

terminating at least one container of the plurality of containers in a first AZ of the plurality of AZs, and responsive to the terminating at least one container, launching at least one new container in a second AZ of the plurality of AZs.

17. The computer-implemented method of claim 16, further comprising:

identifying an operational issue affecting the first AZ, wherein the operational issue affects performance of containers placed by the container service in the first AZ;

modifying the plurality of AZs at which containers associated with the task or service definition can be placed by removing the first AZ affected by the operational issue from the plurality of AZs and adding an additional AZ to the plurality of AZs; and launching a new container based on the task or service definition, wherein the container service places the new container in the additional AZ.

18. The computer-implemented method of claim 17, further comprising obtaining, from an AZ performance monitoring service, an indication of the operational issue affecting the first AZ, wherein the AZ performance monitoring service identifies the operational issue affecting the first AZ based on at least one of: availability of the computing infrastructure in the first AZ, network latency measurements obtained from the first AZ, or compute performance measurements obtained from the first AZ.

19. The computer-implemented method of claim 16, wherein a load balancer distributes application traffic to the plurality of containers, and wherein the method further comprises sending, to the load balancer, instructions to update the distribution of application traffic based on the rebalanced placement of the plurality of containers.

20. The computer-implemented method of claim 16, wherein the placement strategy is a spread placement strategy, and wherein the spread placement strategy causes the container service to spread placement of containers across the plurality of AZs.

\* \* \* \* \*